(12) United States Patent
Proctor

(10) Patent No.: US 8,756,049 B2
(45) Date of Patent: Jun. 17, 2014

(54) SIMULATION AND TEST FRAMEWORK FOR A RULE ENGINE

(75) Inventor: Mark Proctor, London (GB)

(73) Assignee: Red Hat, Inc., Raleigh, NC (US)

(*) Notice: Subject to any disclaimer, the term of this patent is extended or adjusted under 35 U.S.C. 154(b) by 642 days.

(21) Appl. No.: 12/835,633

(22) Filed: Jul. 13, 2010

(65) Prior Publication Data

US 2012/0016831 A1    Jan. 19, 2012

(51) Int. Cl.
*G06F 11/36* (2006.01)
*G06F 9/455* (2006.01)

(52) U.S. Cl.
CPC ........ *G06F 11/3672* (2013.01); *G06F 2201/86* (2013.01); *G06F 11/3664* (2013.01)
USPC ............... 703/22; 706/47; 706/58; 717/124; 717/127

(58) Field of Classification Search
CPC . G06F 11/36; G06F 11/3664; G06F 11/3672; G06F 2201/835; G06F 2201/86; G06N 5/046; G06N 5/047; G06N 5/04
See application file for complete search history.

(56) References Cited

U.S. PATENT DOCUMENTS

| | | | |
|---|---|---|---|
| 6,907,546 B1* | 6/2005 | Haswell et al. | 714/38.11 |
| 7,162,462 B1* | 1/2007 | Mutschler, III | 706/47 |
| 7,305,374 B2* | 12/2007 | Holmes et al. | 706/47 |
| 7,562,255 B2* | 7/2009 | El Far et al. | 717/124 |
| 7,991,727 B2* | 8/2011 | Proctor et al. | 706/47 |
| 8,180,623 B2* | 5/2012 | Lendermann et al. | 703/22 |
| 2005/0096959 A1* | 5/2005 | Kumar et al. | 705/8 |
| 2005/0197821 A1* | 9/2005 | Choi et al. | 703/22 |
| 2011/0040549 A1* | 2/2011 | Ciarallo et al. | 703/17 |
| 2011/0040709 A1* | 2/2011 | Proctor et al. | 706/12 |
| 2011/0173591 A1* | 7/2011 | Prasad | 717/126 |

OTHER PUBLICATIONS

Proctor, Mark "Drools 5 Released" Drools & jBPM (May 2009) available at <http://blog.athico.com/2009/05/drools-5-released.html>.*
Screencapture: <http://planet.jboss.org/feed/drools> accessed Jan. 10, 2013 (Showing postings from Jul. 2, 2009 10:15am to Jul. 12, 2009 11:39pm).*
Proctor, Mark, "Drools Simulation and Test framework", accessed at: http://blog.athico.com/2009/07/drools-simulation-and-test-framework.html on Jul. 13, 2010, last updated Jul. 13, 2009, 6 pages.
Mark Proctor, "Drools Simulation and Test framework," http://planet.jboss.org/post/drools_simulation_and_test_framework, Jul. 13, 2009, 3 pages.

* cited by examiner

*Primary Examiner* — Kamini S Shah
*Assistant Examiner* — Jay B Hann
(74) *Attorney, Agent, or Firm* — Lowenstein Sandler LLP

(57) ABSTRACT

Some embodiments of a simulation and test framework for a rule engine have been presented. In one embodiment, a simulator runs a simulation in a time-aware environment. A rule engine, coupled to the simulator, may execute a set of business logic in response to the simulation in order to test behavior of the business logic. The business logic may include rules, workflow, and event processing.

18 Claims, 4 Drawing Sheets

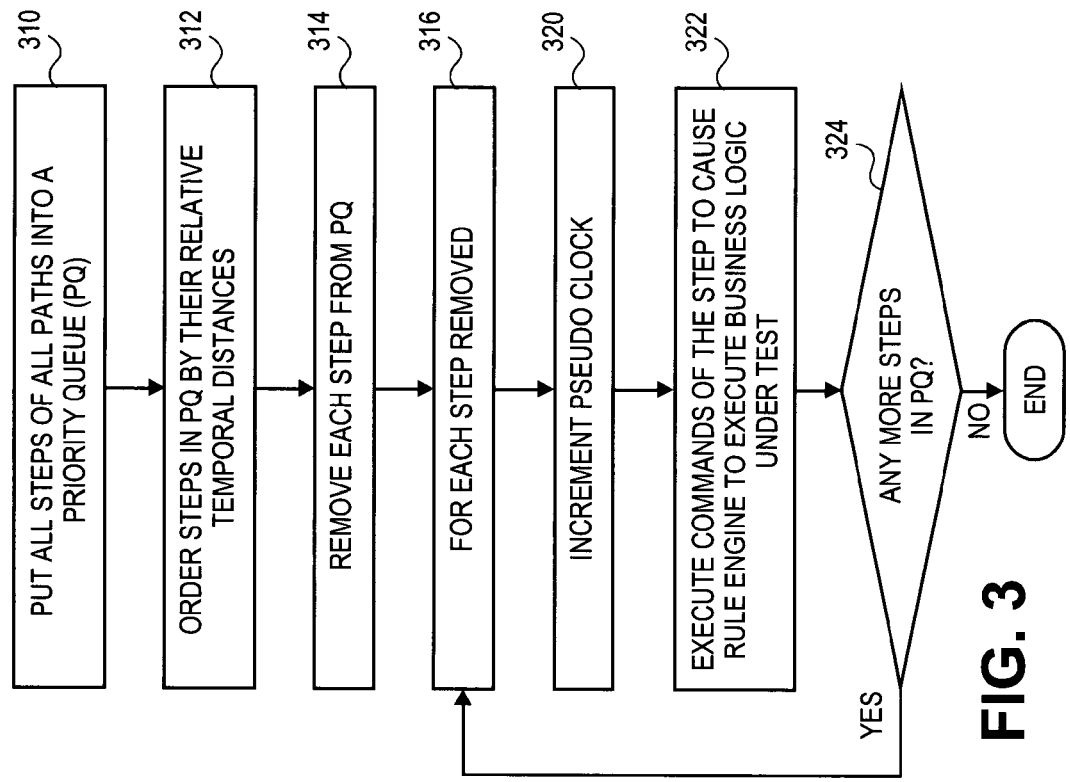

SIMULATION AND TEST FRAMEWORK FOR A RULE ENGINE

TECHNICAL FIELD

Embodiments of the present invention relate to artificial intelligence, and more specifically to rule engines.

BACKGROUND

The development and application of rule engines is one branch of Artificial Intelligence (A.I.), which is a very broad research area that focuses on "making computers think like people." Broadly speaking, a rule engine is a set of one or more software modules running on a computing device (e.g., a server, a personal computer, etc.) that processes information by applying rules to data objects (such as facts). A rule is a logical construct for describing the operations, definitions, conditions, and/or constraints that apply to some predetermined data to achieve a goal. Various types of rule engines have been developed to evaluate and process rules. Conventionally, a rule engine creates a rulebase containing a network (e.g., Rete network) to process rules and data objects. The network may include many different types of nodes, including, for example, root nodes, object-type nodes, alpha nodes, left-input-adapter nodes, beta nodes (e.g., eval nodes, join nodes, not nodes, etc.), and terminal nodes, etc.

To meet the demands of today's business world, more complex applications involving rules, workflow and event processing are developed, where rules, workflow, and event processing may be collectively referred to as business logic. Typically, such complex applications run on separate standalone engines, in addition to the rule engine, with poor integration and totally different approaches, forcing one into a process oriented or rules oriented world.

Furthermore, when testing business logic, tests alone are not ideal because tests do not fully examine the behavior of the business logic.

BRIEF DESCRIPTION OF THE DRAWINGS

The present invention is illustrated by way of example, and not by way of limitation, in the figures of the accompanying drawings and in which:

FIG. 2 illustrates one embodiment of a simulation.

FIG. 3 illustrates one embodiment of a method to run a simulation.

DETAILED DESCRIPTION

Described herein are some embodiments of a simulation and test framework for a rule engine. In one embodiment, a simulator runs a simulation in a time-aware environment. A rule engine, coupled to the simulator, may execute a set of business logic in response to the simulation in order to test behavior of the business logic. The business logic may include rules, workflow, and event processing. Because the rule engine according to some embodiments of the invention processes rules and events in the same rulebase, the rulebase is hereinafter referred to as a "knowledgebase" instead to distinguish it from rulebases created by conventional rule engines. Likewise, a rule session of the rule engine according to some embodiments of the invention is referred to as a knowledge session hereinafter. More details of some embodiments of the simulation and test framework are described below.

Figure 1:
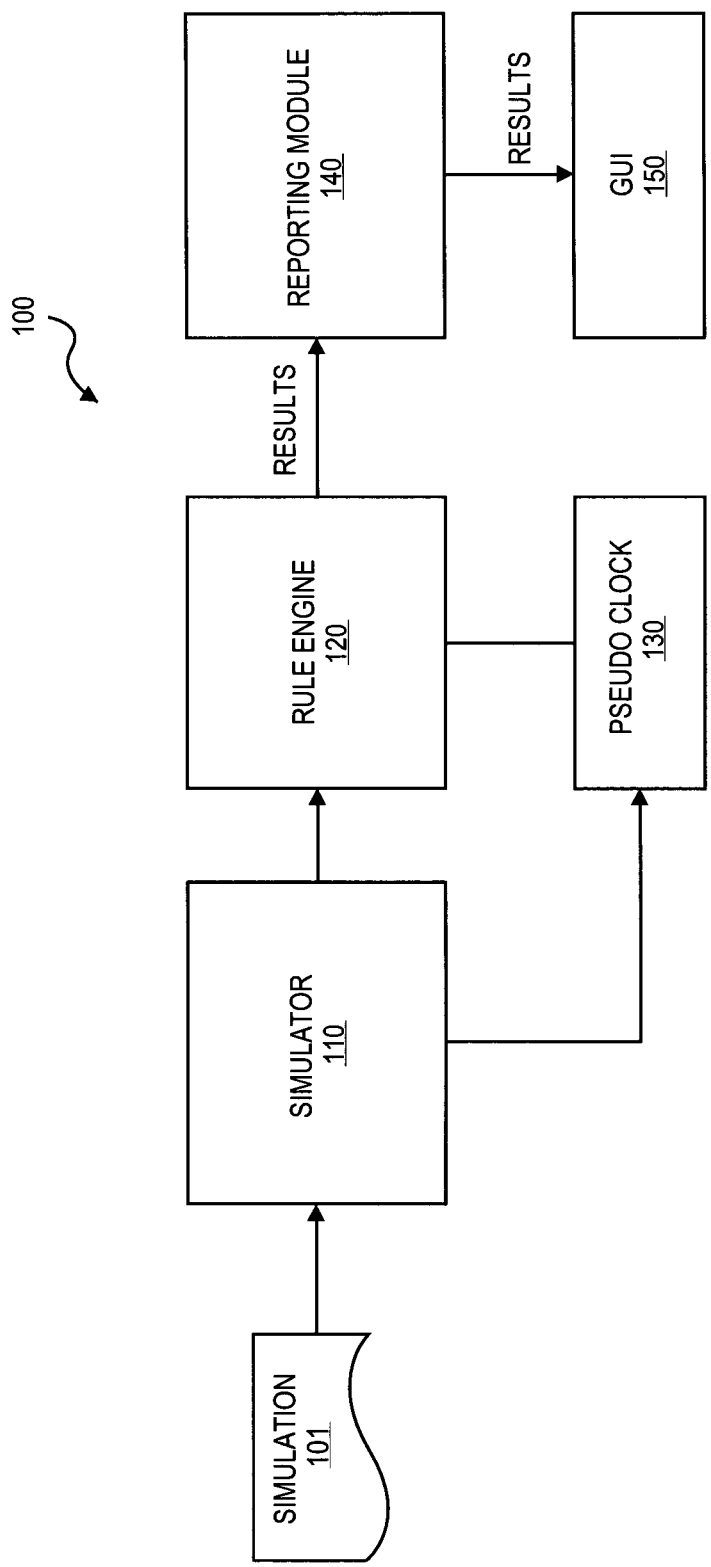
FIG. 1 illustrates one embodiment of a simulation and test framework for an exemplary rule engine.

FIG. 1 illustrates one embodiment of a simulation and test framework for an exemplary rule engine. The framework 100 includes a simulator 110, a rule engine 120, a pseudo clock 130, a reporting module 140, and a graphical user interface (GUI) 150. The simulator 110 is coupled to both rule engine 120 and pseudo clock 130. The rule engine 120 is coupled to both pseudo clock 130 and reporting module 140. The reporting module 140 is further coupled to the GUI 150. Generally speaking, the rule engine 120 is a set of one or more processing modules, which receives facts asserted by users and rules, evaluate the facts against the rules, and may perform certain actions (or cause certain actions to be performed) based on the result of the evaluation. In some embodiments, the rule engine 120 is able to process other types of data objects in addition to facts, such as events. Generally speaking, a rule is a logical construct for describing the operations, definitions, conditions, and/or constraints that apply to some predetermined data to achieve a goal. For example, a business rule might state that no credit check is to be performed on return customers. To test business logic, such as rules, workflow, and event processing, which is executable on the rule engine 120, the simulator 110 may run a simulation 101.

In some embodiments, the simulator 110 receives the simulation 101. A user (e.g., an administrator, a rule developer, etc.) may supply the simulation 101 to the simulator 110 via a GUI, or by providing a path of a file containing the simulation to the simulator 110. One exemplary embodiment of the simulation 101 is shown in details in FIG. 2, which is further discussed below. The simulator 110 may run the simulation 101 in a time-aware environment to test business logic executable on the rule engine 120. To be time-aware, the simulator 110 may be capable of creating a knowledge session, inserting facts, and letting the rule engine 120 run in the knowledge session to evaluate rules against the facts asserted, and then checking the results at the end. In some embodiments, the simulator 110 is further capable of executing specific actions at specific points of time while being able to assert on the rule engine data (e.g., inserted objects, globals, and process variables, etc.) or the engine state itself (e.g., agenda, process instances, etc.) at given points in time.

As mentioned above, the simulator 110 runs the simulation 101. The simulation 101 is analogous to a scenario definition. An exemplary embodiment of the simulation 101 is shown in FIG. 2. Referring to FIG. 2, the simulation 200 includes N paths, where each path may be considered as a thread. A path is a chronological line on which steps are specified at given temporal distances from the start of the simulation 200. For example, one does not have to specify a time unit for a step, say 12:00 am, instead, it is specified as a relative temporal distance from the start of the simulation 200 (e.g., 2 hours 30 minutes from the start of the simulation). Each step contains one or more commands, such as a command to create a stateful knowledge session, a command to insert an object, a command to start a process, etc.

Referring back to FIG. 1, the simulator 110 may execute the commands in the simulation 101 to cause the rule engine 120 to execute business logic under test in order to test the behavior of the business logic. Note that the business logic is not limited to rules. The business logic may include event processing, workflow, etc., in some embodiments. More details on how to run a simulation are further discussed below with reference to FIG. 3.

To make the simulation 101 more flexible, contexts are used in some embodiments. A context may provide key/value pair lookups. Each path in the simulation 101 may have its own context, which may be inherited from a root "global" context. Commands of steps along each path may be executed against given context identifiers. This allows the simulation 101 to have a number of knowledge sessions or knowledge-bases for increased flexibility. A command adapter may be used to make commands aware of the respective contexts. For example, the following command may be used to create a knowledgebase and assign it to the identifier "kbase" in the context for "path1":

```
cmds.add( new SetVariableCommand( "path1", "kbase", new
   NewKnowledgeBaseCommand( null ) ) );
```

In another example, the following command may be used to create a stateful knowledge session and to assign it an identifier "ksession" in the context of "path1":

```
cmds.add( new SetVariableCommand( "path1", "ksession", new
NewKnowledgeContextResolveFromContextCommand( new
NewStatefulKnowledgeSessionCommand( ksessionConf ), null, "kbase",
null ) ) );
```

The NewKnowledgeContextResolveFromContextCommand command adapts the targeted command, telling it that the knowledgebase to be used for the command can be retrieved from the context using the identifier "kbase." The null arguments could be used to specify a KnowledgeBuilder of StatefulKnowledgeSession if the command requires it.

Now that the StatefulKnowledgeSession is assigned to the "ksession" identifier, objects can be inserted into it. Again, the adapter command may be used to tell it to execute the InsertObjectCommand using the "ksession" instance. The null arguments are the positions used to specify a KnowledgeBuilder or KnowledgeBase if the command requires it as follows:

```
cmds.add( new NewKnowledgeContextResolveFromContextCommand
(new
InsertObjectCommand( new Person( yoda ), 98 ) ), null, null,
"ksession") );
```

Note that the command identifiers and command adapters can create a very flexible simulation environment, though a fair amount of verbosity is also added. Thus, in some embodiments, tooling may be added to hide the verbosity and reduce complexity, making the commands easier to use.

In some embodiments, the simulation 101 is defined purely in a marked up language, such as Extensible Marked Up Language (XML). Alternatively, a front end with the look and feel of a spreadsheet may be added to allow simulations to be defined with a tabular metaphor, which may also be easy to use.

By running the simulation 101, the simulator 110 controls the pseudo clock 130 and causes the rule engine to execute the business logic under test using the pseudo clock 130. Conventionally, a rule engine typically uses a realtime clock based off a system clock. In order to provide a time-aware simulation environment, the simulator 110 switches the rule engine 120 from the realtime clock to the pseudo clock 130, which is programmatically controlled by the simulator 110. The simulator 110 may control time increments of the pseudo clock 130, based on definitions in the simulation 101.

Figure 4:
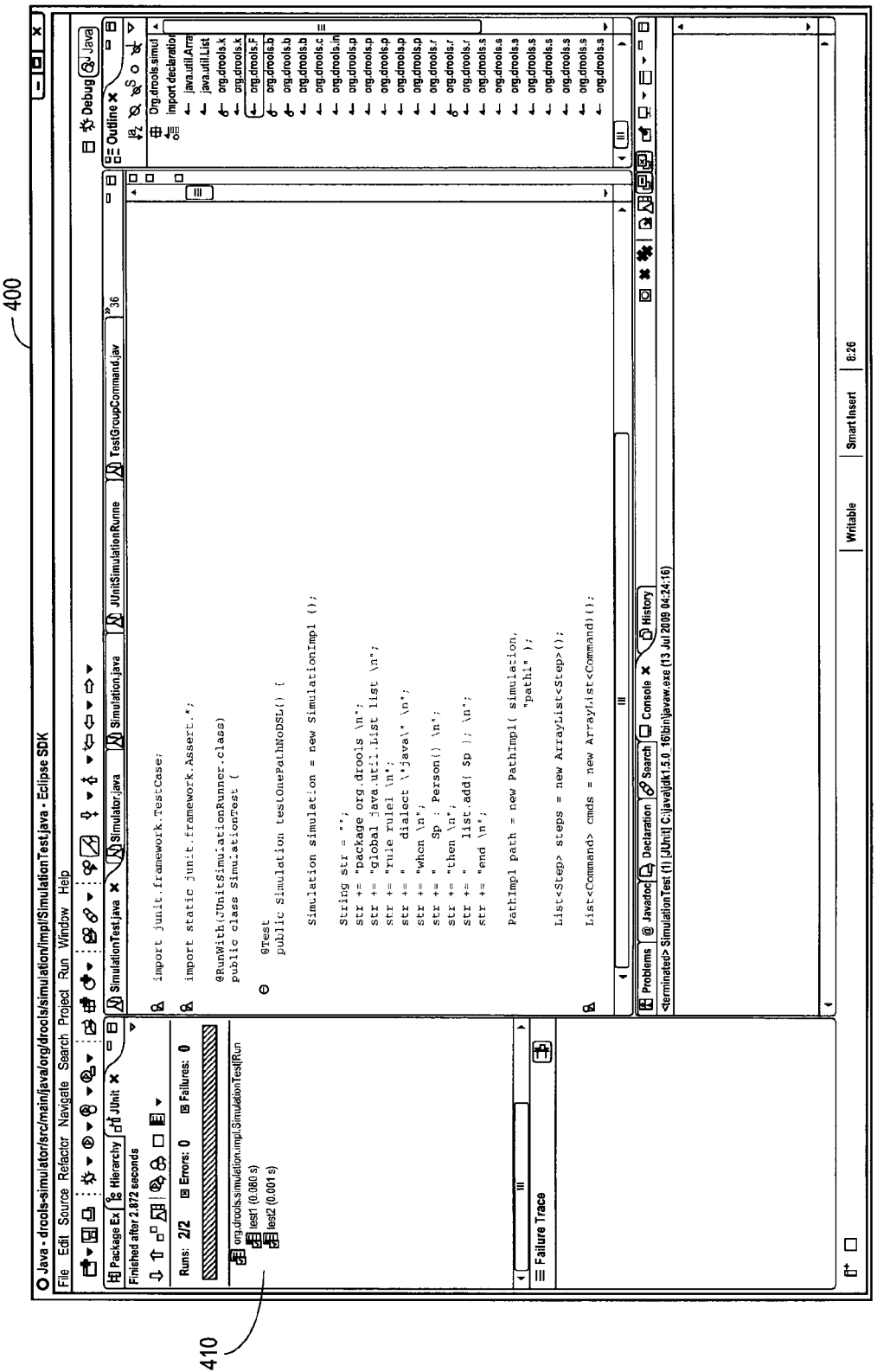
FIG. 4 illustrates one embodiment of a graphical user interface (GUI).

Results from the rule engine 120 may be output to the reporting module 140, which may present the result via the GUI 150. One exemplary embodiment of the GUI 150 is shown in FIG. 4. Alternatively, the reporting module 140 may output the result into a file, which may be stored on a computer-readable storage medium (e.g., a hard drive, a flash memory card, etc.) or transmitted to another computing device (e.g., a server, a personal computer, etc.).

FIG. 3 illustrates one embodiment of a method to run a simulation. The method may be performed by processing logic that may comprise hardware (e.g., circuitry, dedicated logic, programmable logic, microcode, etc.), software (such as instructions run on a processing device), firmware, or a combination thereof. For example, the simulator 110 in FIG. 1 may perform at least part of the method in some embodiments.

Referring to FIG. 3, processing logic puts all steps of all paths of the simulation into a priority queue (processing block 310). As discussed above, the simulation may include a number of paths, where each path contains one or more steps along a chronological line of the respective path, and each step contains one or more commands. Processing logic then orders the steps in the priority queue by their relative temporal distances (processing logic 312). For example, step A, which is 2 hours from the start of the simulation, may be put behind step B, which is 1 hour from the start of the simulation, in the priority queue. Note that step A and step B may or may not be from the same path in the simulation.

To run the simulation, processing logic removes each step from the priority queue sequentially (processing block 314). For each step removed, processing logic may increment a pseudo clock (processing block 320), and execute commands of the step to cause the rule engine to execute the business logic under test (processing block 322). Then processing logic checks if there is any more steps in the priority queue (processing block 324). If there is, then processing logic returns to processing block 316 to repeat the above operations. Otherwise, the method ends.

In some embodiments, commands can be grouped together, especially assertion commands, into test groups. The test groups may be mapped to "test methods" of JUnit, so as the test groups pass or fail using a specialized Junit Runner, a GUI may be updated to report the test results. One exemplary embodiment of a GUI is illustrated in FIG. 4. The GUI 400 shows two passed test groups 410, namely, Test1 and Test2.

Figure 5:
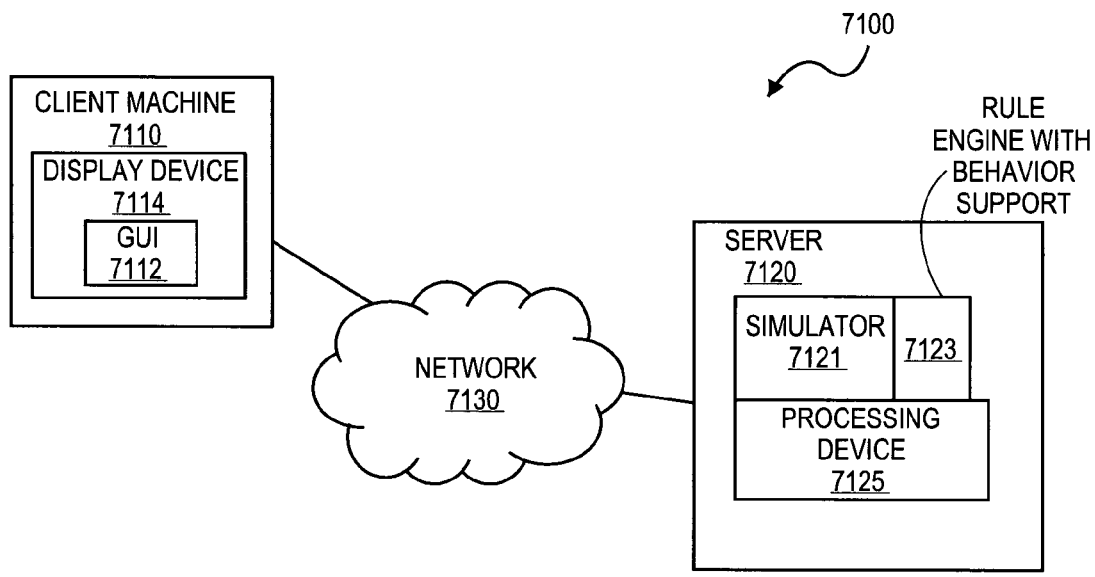
FIG. 5 shows one embodiment of a system usable with some embodiments of the present invention.

FIG. 5 illustrates one embodiment of a system usable with some embodiments of the present invention. The system 7100 includes a client machine 7110 and a server 7120, which are coupled to each other via a network 7130. The client machine 7110 may include a computing machine, such as a desktop personal computer (PC), a laptop PC, a personal digital assistant (PDA), a mobile telephone, etc. The network 7130 coupling the client machine 7110 to the server 7120 may include various kinds of networks, such as an intranet, the Internet, a local area network (LAN), etc.

In some embodiments, the server 7120 includes a simulator 7121 and a rule engine 7123 (such as the simulator 110 and the rule engine 120 as illustrated in FIG. 1). Both the simulator 7121 and the rule engine 7123 are executable on a processing device 7125 of the server 7120. The processing device 7125 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 7125 may also be one or more special-purpose processing devices such as an application specific integrated circuit (ASIC), a field programmable gate array (FPGA), a digital signal processor (DSP), network processor, or the like. In some embodiments, the server 7120 further includes a network interface to couple to the client machine 7110 via the network 7130.

The client machine 7110 may present a graphical user interface (GUI) 7112 (e.g., a webpage rendered by a browser) using a display device 7114 (e.g., a liquid crystal display (LCD), a cathode ray tube (CRT), etc.). Via the GUI 7112, users are allowed to input simulation, rule sets, events, and/or facts, etc., which may be sent to the server 7120 to be processed using the simulator 7121 and the rule engine 7123 as discussed above.

Note that each of the client machine 7110 and the server 7120 may include additional components not shown, such as alphanumeric input device (e.g., keyboard), a cursor control device (e.g., a mouse), a signal generation device (e.g., speaker), computer-readable storage medium (e.g., hard drive), etc.

Figure 6:
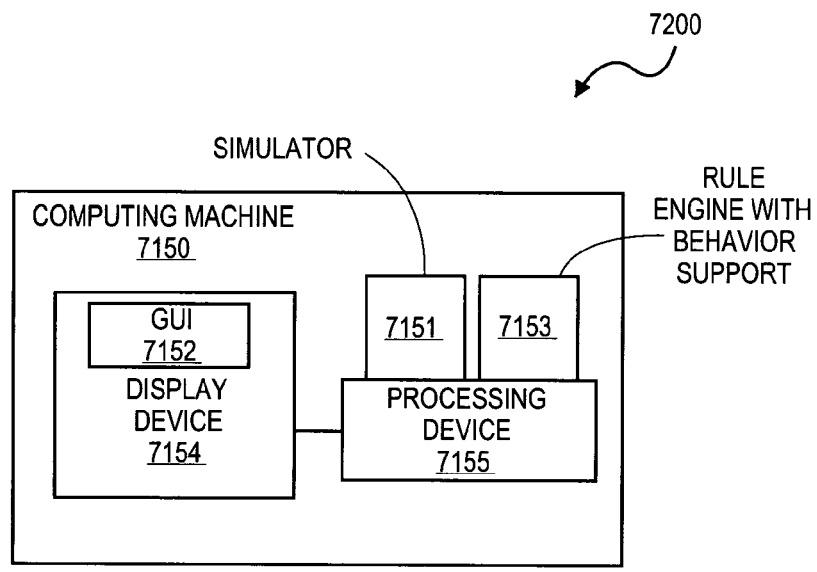
FIG. 6 shows an alternate embodiment of a system usable with some embodiments of the present invention.

FIG. 6 illustrates an alternate embodiment of a system usable with some embodiments of the present invention. The system 7200 includes a computing machine 7150, which may be implemented using a desktop personal computer (PC), a laptop PC, a personal digital assistant (PDA), a mobile telephone, etc. The computing machine 7150 includes a simulator 7151, a rule engine 7153, and a GUI 7152. Some embodiments of the simulator 7151 and the rule engine 7153 have been discussed above with reference to FIG. 1. In some embodiments, users may input files of simulations, rules, and/or data objects using the GUI 7152. Then the files may be processed by the simulator 7151 and the rule engine 7153 as discussed above.

Both the simulator 7151 and the rule engine 7153 may be executable on a processing device 7155 of the computing machine 7150. The processing device 7155 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 7155 may also be one or more special-purpose processing devices such as an application specific integrated circuit (ASIC), a field programmable gate array (FPGA), a digital signal processor (DSP), network processor, or the like.

The computing machine 7150 further includes a display device 7154, coupled to the processing device 7155, to display the GUI 7152. The display device 7154 may include a liquid crystal display (LCD), a cathode ray tube (CRT), a touch screen, etc.

Note that the client machine 7150 may include additional components not shown, such as alphanumeric input device (e.g., keyboard), a cursor control device (e.g., a mouse), a signal generation device (e.g., speaker), computer-readable storage medium (e.g., hard drive), etc.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "executing" or "running" or "grouping" or "ordering" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description above. In addition, the present invention is not described with reference to any particular programming language. It will be appreciated that a variety of programming languages may be used to implement the teachings of the invention as described herein.

Thus, some embodiments of a simulation and test framework for a rule engine have been described. It is to be understood that the above description is intended to be illustrative, and not restrictive. Many other embodiments will be apparent to those of skill in the art upon reading and understanding the above description. The scope of the invention should, there-

What is claimed is:

1. A method comprising:
performing, by a simulator executing on a processing device, a simulation in a time-aware environment, wherein the simulation comprises at least an application for testing and further comprises paths that each comprise:
  groups of one or more commands along a chronological line, each group specified at given temporal distances from a start of the chronological line; and
  a context to provide key and value pair lookups, wherein the one or more commands of a group are executed against the context; and
switching, by the simulator, a rule engine executing on the processing device from a realtime clock to a simulation clock, wherein the rule engine comprises a set of processing modules and is different from the application, the simulator, and the simulation;
executing, by the rule engine, a set of business logic in response to the simulation to test behavior of the business logic; and
controlling, by the simulator, time increments of the simulation clock in view of the simulation.

2. The method of claim 1, further comprising:
sorting, by the simulator, the one or more commands of each of the groups of each of the paths in the simulation into a plurality of test groups; and
updating, by the simulator, a graphical user interface (GUI) to report results of running the simulation by each test group of the plurality of test groups.

3. The method of claim 1, further comprising:
adding, by the simulator, the groups of the paths of the simulation into a priority queue; and
executing, by the simulator using the rule engine, each of the groups in increments according to a time slicing approach.

4. The method of claim 1, further comprising:
adding, by the simulator, the groups of the paths of the simulation into a priority queue, wherein each of the groups of the paths are specified at given temporal distances from a start of the simulation;
ordering, by the simulator, the groups in the priority queue in view of relative temporal distances of the groups;
removing, by the simulator, each of the groups from the priority queue in turn after the ordering of the groups; and
for each group removed from the priority queue, incrementing, by the simulator, an engine clock for the group removed and executing the one or more commands of the group to cause the rule engine to execute the set of business logic.

5. The method of claim 1, wherein the simulation is defined in a marked up language.

6. The method of claim 1, wherein the business logic comprises at least one of rules, workflow, or event processing.

7. An apparatus comprising:
a memory;
a processing device communicably coupled to the memory;
a simulator, executable from the memory by the processing device, the simulator to:
  perform a simulation in a time-aware environment, wherein the simulation comprises at least an application for testing and further comprises paths that each comprise:
    groups of one or more commands along a chronological line, each group specified at given temporal distances from a start of the chronological line; and
    a context to provide key and value pair lookups, wherein the one or more commands of a group are executed against the context;
  switch the rule engine from a realtime clock to a simulation clock, wherein the rule engine comprises a set of processing modules and is different from the application, the simulator, and the simulation; and
  control time increments of the simulation clock in view of the simulation; and
a rule engine communicably coupled to the simulator and executable from the memory by the processing device, the rule engine to execute a set of business logic in response to the simulation to test behavior of the business logic.

8. The apparatus of claim 7, wherein the simulator is further to sort commands of each of the groups of each of the paths in the simulation into a plurality of test groups, and to update a graphical user interface (GUI) to report results of running the simulation by each of the plurality of test groups.

9. The apparatus of claim 7, wherein the simulator is further to add the groups of the paths of the simulation into a priority queue, and to incrementally execute the groups using the rule engine according to a time slicing approach.

10. The apparatus of claim 7, wherein the simulator is further to:
add groups of the paths of the simulation into a priority queue, wherein the groups of the paths are specified at given temporal distances from a start of the simulation;
order the groups in the priority queue in view of relative temporal distances of the groups;
remove each of the groups from the priority queue in turn after ordering the groups; and
for each group removed from the priority queue, increment an engine clock for the group removed and execute commands of the group to cause the rule engine to execute the set of business logic.

11. The apparatus of claim 7, wherein the simulation is defined in a marked up language.

12. The apparatus of claim 7, wherein the business logic comprises at least one of rules, workflow, or event processing.

13. A non-transitory computer-readable storage medium embodying instructions that, when executed by a processing device, cause the processing device to perform operations comprising:
performing, by a simulator executed by the processing device, a simulation using a simulator in a time-aware environment, wherein the simulation comprises at least an application for testing and further comprises paths that each comprise:
  groups of one or more commands along a chronological line, each group specified at given temporal distances from a start of the chronological line; and
  a context to provide key and value pair lookups, wherein the one or more commands of a group are executed against the context; and
switching, by the simulator, a rule engine executing on the processing device from a realtime clock to a simulation clock, wherein the rule engine comprises a set of processing modules and is different from the application, the simulator, and the simulation;

executing, by the rule engine, a set of business logic in response to the simulation to test behavior of the business logic; and controlling, by the simulator, time increments of the simulation clock in view of the simulation.

14. The non-transitory computer-readable storage medium of claim 13, wherein the simulator further to:
   sort the one or more commands of each of the groups of each of the paths in the simulation into a plurality of test groups; and
   update a graphical user interface (GUI) to report results of running the simulation by each of the plurality of test groups.

15. The non-transitory computer-readable storage medium of claim 13, wherein the simulator further to:
   add the groups of all paths of the simulation into a priority queue; and
   execute, using the rule engine, the groups in increments according to a time slicing approach.

16. The non-transitory computer-readable storage medium of claim 13, wherein the simulator further to:
   add the groups of the paths of the simulation into a priority queue, wherein the groups of the paths are specified at given temporal distances from a start of the simulation;
   order the groups in the priority queue in view of relative temporal distances of the groups;
   remove each of the groups from the priority queue in turn after ordering the groups; and
   for each group removed from the priority queue, increment an engine clock for each group removed and execute commands of the group to cause the rule engine to execute the set of business logic.

17. The non-transitory computer-readable storage medium of claim 13, wherein the simulation is defined in a marked up language.

18. The non-transitory computer-readable storage medium of claim 13, wherein the business logic comprises at least one of rules, workflow, or event processing.

\* \* \* \* \*